United States Patent
Wang et al.

(10) Patent No.: US 11,788,212 B2
(45) Date of Patent: Oct. 17, 2023

(54) SEMI-DULL POLYESTER DRAWN YARNS AND PREPARING METHOD THEREOF

(71) Applicant: JIANGSU HENGLI CHEMICAL FIBRE CO., LTD., Wujiang (CN)

(72) Inventors: Lili Wang, Wujiang (CN); Zangzang Niu, Wujiang (CN); Chaoming Yang, Wujiang (CN)

(73) Assignee: JIANGSU HENGLI CHEMICAL FIBRE CO., LTD., Wujiang (CN)

( * ) Notice: Subject to any disclaimer, the term of this patent is extended or adjusted under 35 U.S.C. 154(b) by 582 days.

(21) Appl. No.: 17/042,129

(22) PCT Filed: Oct. 29, 2019

(86) PCT No.: PCT/CN2019/113839
§ 371 (c)(1),
(2) Date: Sep. 27, 2020

(87) PCT Pub. No.: WO2020/134494
PCT Pub. Date: Jul. 2, 2020

(65) Prior Publication Data
US 2021/0017673 A1 Jan. 21, 2021

(30) Foreign Application Priority Data

Dec. 27, 2018 (CN) .......................... 201811615755.7

(51) Int. Cl.
*D01F 6/92* (2006.01)
*B01J 23/18* (2006.01)
*C08K 3/22* (2006.01)
*D01F 11/08* (2006.01)

(52) U.S. Cl.
CPC ................ *D01F 6/92* (2013.01); *B01J 23/18* (2013.01); *C08K 3/22* (2013.01); *D01F 11/08* (2013.01); *D10B 2331/04* (2013.01)

(58) Field of Classification Search
None
See application file for complete search history.

(56) References Cited

U.S. PATENT DOCUMENTS 4,113,704 A    9/1978  MacLean et al.

FOREIGN PATENT DOCUMENTS

| CN | 101139435 A | 3/2008 |
| CN | 102000584 A | 4/2011 |
| CN | 106367835 A | 2/2017 |
| CN | 109722738 A | 5/2019 |
| KR | 20150061977 A | 6/2015 |

OTHER PUBLICATIONS

Zhiqian Yang, Study on the PET Fiber Modified By Silicon Compound, 2014, pp. 1-101.

*Primary Examiner* — Robert T Butcher
(74) *Attorney, Agent, or Firm* — Bayramoglu Law Offices LLC

(57) ABSTRACT

A type of semi-dull polyester drawn yarns and preparing method thereof are disclosed. The preparing method is to melt spinning a modified polyester with FDY technique, wherein the modified polyester is the product of the esterification and the successive polycondensation reactions of evenly mixed terephthalic acid, ethylene glycol, main chain silicated diol, fluorinated dicarboxylic acid, matting agent and doped $Bi_2O_3$, in which the main chain silicated diol could be dimethylsiloxane diol, dimethyldiphenyldisiloxane glycol or tetramethyldisiloxane diol, and in which the fluorinated dicarboxylic acids could be 2,2-difluoro-1,3-malonic acid, 2,2-difluoro-1,4-succinic acid, 2,2-difluoro-1,5-glutaric acid or 2,2,3,3-tetrafluoro-1,4-succinic acid. The obtained fiber has a dye uptake of 87.5-91.8% when dyed at 120° C., and has an intrinsic viscosity drop of 18-26% when stored at 25° C. and R.H. 65% for 60 months. This invention features a method with ease of application and a product with good dyeing and degradation performance.

16 Claims, No Drawings

SEMI-DULL POLYESTER DRAWN YARNS AND PREPARING METHOD THEREOF

CROSS REFERENCE TO THE RELATED APPLICATIONS

This application is the national phase entry of International Application No. PCT/CN2019/113839, filed on Oct. 29, 2019, which is based upon and claims priority to Chinese Patent Application No. 201811615755.7, filed on Dec. 27, 2018, the entire contents of which are incorporated herein by reference.

TECHNICAL FIELD

The present invention belongs to the field of polyester fiber, and more particularly, relates to one type of semi-dull polyester drawn yarns and preparing method thereof.

BACKGROUND

Polyester (PET) fiber has been widely applied to the fields of clothing, home textile and so on because of its high breaking strength, high elastic modulus, moderate resilience, excellent thermal setting, good resistance to heat, light, acid and alkali, as well as the anti-crease, non-iron and good stiffness of its fabric. With the continuous improvement of living standards in modern society, the requirement for sports, leisure, fashion, comfort and health fabrics has become higher and higher, and various manufacturers have begun to search after high perceptual and high functional polyester fiber products under the stimulation of huge market benefits. Thus far series of differential fibers such as dull, semi dull, moisture absorption and perspiration, antibacterial, mosquito proof, colored and flame retardant fibers have been developed to provide novel high-quality raw materials for clothing fabrics and home textiles.

Due to their smooth surface and certain transparency, polyester fibers tend to reflect most illumination light and show a dazzling and uncomfortable luster, commonly known as glare. Fortunately, the glare can be dimmed by guiding the reflective light to different directions through a small amount of particles with heterologous refractive index, which is usually called extinction treatment, and the added material is known as matting agent. In polyester fiber production, titania ($TiO_2$) is widely used as matting agent because of its high refractive index (2.60 prior to 1.00 of the air), chemical stability, good dispersion, water-infusibility and durability against post-treatment and washing.

Although the semi-dull fiber could be obtained with extinction treatment, in the PET molecular chains there are no hydrophilic groups or dye site groups just like those existed cellulose or protein fiber, PET fiber, with a hydrophobicity and inertia manner, shows an unsatisfied dyeability. In addition, PET fiber possesses a type of partly crystallized supramolecular structure, specifically, a coexistence state of crystalline regions composed of parallel molecular chains mostly in trans-conformation and amorphous regions composed of molecular chains mostly in cis-conformation, and such tight molecular arrangement increases the dyeing difficulty of PET fiber even more. At present, conventional PET fiber is usually dyed with disperse dyes at high temperature (130° C.) and high pressure to ensure the dye uptake. However, the requirement of specific equipment and high energy consumption originated from the high temperature and high pressure dyeing, together with the long time consumption resulted from the dyeing difficulty mentioned above, the cost of PET fiber dyeing is rather high. At the same time, with the rapid development of PET industry, although PET will not directly cause harm to the environment, PET waste has become a global environmental pollution organic matter due to its huge amount and strong resistance to atmospheric and microbial degradation.

Therefore, it is of great significance to develop a preparation method of semi dull polyester drawn yarn with excellent dyeing performance and high efficiency of degradation and recovery.

SUMMARY

The primary object of the present invention is to provide one kind of semi dull polyester drawn yarns with excellent dyeing performance and high efficiency of degradation and recovery as well as preparing method thereof, so as to overcome the wherein said inadequacies in the PET fiber made from the existing technology.

To this end, the key technical points of the invention are as follows.

The preparing method of semi-dull polyester drawn yarns is to melt spinning a modified polyester with Fully Drawn Yarn (FDY) technique;

wherein said modified polyester is the product of the esterification and the successive polycondensation reactions of evenly mixed terephthalic acid, ethylene glycol, main chain silicated diol, fluorinated dicarboxylic acid, matting agent and doped $Bi_2O_3$;

wherein said main chain silicated diol could be dimethylsiloxane diol, dimethyldiphenyldisiloxane glycol or tetramethyldisiloxane diol, and wherein said fluorinated dicarboxylic acids could be 2,2-difluoro-1,3-malonic acid, 2,2-difluoro-1,4-succinic acid, 2,2-difluoro-1,5-glutaric acid or 2,2,3,3-tetrafluoro-1,4-succinic acid;

wherein said modified polyester has a matting agent content of 0.20-0.25 wt %, wherein said doped $Bi_2O_3$ is obtained through a process of evenly mixing $Ca^{2+}$ solution and $Bi^{3+}$ solution firstly, then adding the precipitant until the pH value of mixed solution becomes 9-10, and finally calcining the precipitate product.

In the present invention the improvement in dyeing performance and natural degradation performance of semi-dull polyester drawn yarns is carried out by introducing main chain silicated diol, fluorinated dicarboxylic acid and doped $Bi_2O_3$;

wherein said main chain silicated diol can significantly improve the dyeing performance and promote the natural degradation to a certain extent through increasing the molecular free volume of semi-dull polyester drawn yarns.

Disperse dyes are some small molecules without water-soluble groups, and mostly exist in the form of particles with a size ranged from several hundred nanometers to one micron. During the dyeing process of herein said modified polyester, the segments containing —Si—O—Si— bond will move prior to those just containing carbon oxygen bond with the increasing temperature because the silicon oxygen bond has a longer bond length and a lower internal rotation activation energy. When the temperature of dyeing bath reaches 120-130° C., the silicon oxygen bonded molecular chains can form larger free volume owing to their active molecular movement beyond those carbon oxygen bonded ones. Therefore, the diffusion of dye particles into the polyester fiber and the penetration of dye molecules into the polyester macromolecule will be enhanced significantly, which can reduce the dyeing temperature, shorten the dyeing time, reduce the energy consumption, and improve the dye uptake of the fiber.

The special feature of the fluorinated dicarboxylic acid introduced herein is that the fluorine atom is bonded to α-C. During the hydrolysis process of polyester, the electron cloud density in the C—O bond is reduced by the electron-withdrawing effect of fluorine atom boned to the α-C hence the stability of the tetrahedral anion intermediate formed by ester carbonyl together with nucleophilic attacker will also decrease, which is conducive to the nucleophilic addition reaction. Moreover, the steric hindrance of fluorinated dicarboxylic acid is less than that of terephthalic acid, which further promotes the nucleophilic addition reaction, thus significantly increasing the degradation rate.

The doping modification for $Bi_2O_3$ powder in order to improving the natural degradation property of polyester is also put forward herein. When oxygen reduction catalyst is adopted in polyester, oxygen from air can penetrate into polyester via the free volume wherein, and the oxygen reduction reaction will occur in the surface of catalyst to cause the broken of ester bond, accordingly the polyester degradation will be promoted. However, the further improvement of the degradation efficiency of pure oxygen reduction catalyst is still limited. In the present invention, calcium oxide doped $Bi_2O_3$, instead of the mechanical mixture of calcium oxide and bismuth oxide, is dispersed in the modified polyester. The crystal plane of $Bi_2O_3$ will be destroyed by calcium oxide doping, leading to the following effects. On the one hand, the specific surface area of doped $Bi_2O_3$ increases, which can improve the oxygen adsorption capacity per unit mass of $Bi_2O_3$. Moreover, the oxygen adsorption mode in the surface of doped $Bi_2O_3$ will change to the side type adsorption from the end type adsorption in original monoclinic $Bi_2O_3$, and the adsorption is not affected by the steric hindrance of Bi atom in the surface. With the enhanced chemical adsorption of $O_2$ molecule at the Bi atom site and the improved catalytic efficiency of oxygen reduction, the polyester fiber containing doped $Bi_2O_3$ has a high degradation efficiency, which is conducive to environmental protection.

The following preferred technology program is presented to give a detailed description for this invention.

Herein said preparing method of the semi-dull polyester drawn yarns includes a doping modification process for the oxygen reduction catalyst just as mentioned above;

wherein said $Ca^{2+}$ solution is an aqueous one with a concentration of 2-3%, in which the anion is $NO_3^-$; wherein said $Ba^{3+}$ solution is a product of dissolving 20-25 wt % of $Bi_2O_3$ in nitric acid; wherein said precipitant is ammonia water with a concentration of 2 mol/L;

wherein said evenly mixed solution has a 5-8:100 of molar ratio of $Ca^{2+}$ respective to $Bi^{3+}$ before precipitation; the oxygen reduction is accelerated by introducing $Ca^{2+}$ ions into the main catalyst $Bi_2O_3$ to increase the conduction rate of oxygen ions; hence if the ion molar ratio is too high the performance of will be affected whereas if the ion molar ratio is too small the oxygen ion conduction rate cannot be improved obviously;

wherein said precipitate calcining is preceded by a washing and drying process, and the drying is carried out under a temperature of 105-110° C. for 2-3 hr;

wherein said calcining includes steps of a 400° C. heating for 2-3 hr, a 700° C. heating for 1-2 hr and a cooling in air; then the doped $Bi_2O_3$ is finally crushed into powder. In this invention calcination is a process of importing calcium atom into the crystal lattice of $Bi_2O_3$ to form more defects in the catalyst phase and make them highly dispersed in the surface of solid solution, so as to destroy the crystal plane structure of $Bi_2O_3$. If the cooling rate of calcined precipitate is too slow, calcium oxide or bismuth oxide tends to crystallize independently, which will weaken the destruction of crystal plane, however a cooling in air is conductive to the formation of crystals while not to the destruction of crystal plane.

Herein said preparing method of the semi-dull polyester drawn yarns also includes a modified polyester manufacturing process composed of following steps:

(1) Esterification

Firstly, terephthalic acid, ethylene glycol, main chain silicated diol and fluorinated dicarboxylic acid are concocted into a slurry, then the doped $Bi_2O_3$, the catalyst, the matting agent and the stabilizer are added in and mixed evenly. The esterification is carried out afterwards under the pressure of nitrogen, wherein the pressure range from atmospheric pressure to 0.3 MPa while reaction temperature is 250-260° C., and the end point of esterification is chosen as the moment when the elimination of water reach 90% of the theoretical value.

(2) Polycondensation

After the esterification hereinabove, the polycondensation is performed under negative pressure, which includes two successive stages, i.e., a) coarse vacuum stage, wherein the pressure is smoothly reduced from the normal value to less than 500 Pa within 30-50 min, and the reaction temperature is 250-260° C. while reaction time is 30-50 min, b) fine vacuum stage, wherein the pressure is furtherly reduced to less than 100 Pa, and the reaction temperature is 270-282° C. while reaction time is 50-90 min.

For the preparing method of semi-dull polyester drawn yarns mentioned above, the molar ration of terephthalic acid and ethylene glycol is 1:1.2-2.0, and being relative to the amount of terephthalic acid, the total addition of main chain silicated diol and fluorinated dicarboxylic acid with a molar ratio of 2-3:3-5 is 3-5 mol %, while the additions of the doped $Bi_2O_3$, the catalyst, the matting agent and the stabilizer are 0.04-0.07 wt %, 0.03-0.05 wt %, 0.20-0.25 wt % and 0.01-0.05 wt %, respectively. Although the additions amount of main chain silicated diol, fluorinated dicarboxylic acid and doped $Bi_2O_3$ could be adjusted according to the actual application, the adjustment range should not be too large. If the addition amount is too large, it will affect the properties (mainly mechanical property) in the future application, whereas if the addition amount is too small, it is difficult to significantly improve the dyeing performance or natural degradation performance of the fiber.

For the preparing method of semi-dull polyester drawn yarns mentioned above, wherein said catalyst is antimony trioxide, ethylene glycol antimony or antimony acetate, wherein said matting agent is titanium dioxide, and wherein said stabilizer is triphenyl phosphate, trimethyl phosphate or trimethyl phosphite.

For the preparing method of semi-dull polyester drawn yarns mentioned above, wherein said modified polyester has a molecular weight of 25000-30000 Da and a molecular weight distribution index of 1.8-2.2.

For the preparing method of semi-dull polyester drawn yarns mentioned above, wherein said FDY technique includes steps of metering, spinneret extruding, cooling, oiling, stretching, heat setting and winding.

The technological parameters of wherein said FDY process are chosen as follows: spinning temperature 285-295° C., cooling temperature 17-22° C., interlacing pressure 0.20-0.30 MPa, godet roller 1 speed 2300-2700 m/min, godet roller 1 temperature 80-90° C., godet roller 2 speed 4200-4500 m/min, godet roller 2 temperature 125-140° C., winding speed 4130-4420 m/min.

One type of semi-dull polyester drawn yarn is also presented herein, which is the modified polyester FDY;

wherein said modified polyester has a molecular chain structure composed of terephthalic acid segments, ethylene glycol segments, main chain silicated diol segments and fluorinated dicarboxylic acid segments;

wherein said modified polyester is also dispersed by matting agent and doped $Bi_2O_3$ powder, and the content of matting agent is 0.20-0.25 wt %.

Herein said semi-dull polyester drawn yarn obtained through the preferred technology program mentioned above has the following performance indices: monofilament fineness 0.7-3.0 dtex, breaking strength ≥3.5 cN/dtex, elongation at break 32.0±4.0%, interlacing degree 13±2/m, linear density deviation rate ≤1.0%, breaking strength CV value ≤5.0%, breaking elongation CV value ≤9.0%, and boiling water shrinkage rate 6.5±0.5%. Herein said semi-dull polyester drawn yarn containing main chain silicated diol segments and fluorinated dicarboxylic acid segments as well as doped $Bi_2O_3$ possesses a performance or quality not lower than that from the existed techniques, i.e., after modification the polyester fiber still shows good spinnability and mechanical property.

Herein said semi-dull polyester drawn yarn has a dyeing performance as follows: dye uptake is 87.5-91.8% (at 120° C.), K/S value is 22.17-25.56, color fastness to soaping (polyester staining and cotton staining) is level 5, color fastness to dry crocking is level 5, and color fastness to wet crocking is more than 4. Comparatively, the dyeing performance indices measured under the same conditions for the contrast sample made of common polyester are listed as follows: dye uptake is 85.6% (even at 130° C.), K/S value is 21.28, color fastness to soaping is lower than level 5 (level 4-5 under polyester staining and level 4 under cotton staining), color fastness to dry crocking is level 4-5 and color fastness to wet crocking is level 3-4.

Herein said semi-dull polyester drawn yarn will show an intrinsic viscosity drop of 18-26% after a storage at 25° C. and R.H. 65% for 60 months, implying a significantly accelerated natural degradation rate owing to the synergistic effect of fluorinated dicarboxylic acid and doped $Bi_2O_3$.

The mechanism of this invention could be described as follows.

In the present invention, the dyeing performance of polyester fiber is effectively improved by modifying polyester with main chain silicated diol, based on which the accelerated degradation, i.e., the recovery of polyester fiber is also realized by adding doped $Bi_2O_3$.

The main chain silicated diol thereof could be dimethylsiloxane glycol, dimethyldiphenyldisiloxane glycol or tetramethyldisiloxane glycol, and their structural formulas are as follows:

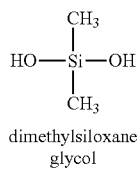
dimethylsiloxane glycol

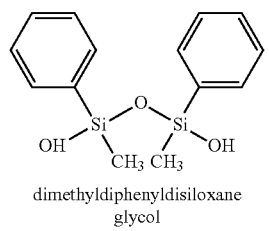
dimethyldiphenyldisiloxane glycol

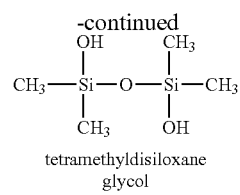
tetramethyldisiloxane glycol

The rigidity of polymer chain depends on the internal rotation potential barrier between the molecular segments, and various chain structures, i.e., unequal bond angles, unequal bond lengths or different bonding modes, will result in diverse molecular rigidities. In the present invention, —Si—O—Si— bonds will formed in main chain of polyester after importing silicated diol. The bond length between silicon atom and oxygen atom is relatively long and the internal rotation activation energy is rather low, which is favorable to the free rotation of atoms. Meanwhile, the silicon atoms in the main chain are bonded with —$CH_3$ which is perpendicular to the plane where —Si—O—Si— lies in, and the steric repulsion between those methyl groups will further enlarge the length of Si—O bond, in addition, the macromolecular chains themselves are also spaced by those inert methyl groups. Therefore, such silicated diol contained polyester has a fairly flexible molecular chain structure and an obviously enlarged free volume compared with unmodified one. However, if a long side chain instead of methyl group is bonded to silicon atom, the limited increases of free volume and the entanglements between those long side chains just bring a less than desirable promotion on the penetration and diffusion of dye molecules. The increase of free volume is favorable for water or dye molecules to penetrate into the modified polyester, drawing a positive impact on the dyeing of polyester fiber such as obtaining higher dye uptake with lower dyeing temperature, shorter dyeing time and less energy consumption.

On the other hand, the hydrolysis of polyester in alkaline medium is a nucleophilic addition-elimination process. During the ester hydrolysis, the nucleophilic addition reaction will occur firstly, in which $OH^-$ attacks C atom in ester carbonyl RCOOR' to form a tetrahedral anion intermediate. From this tetrahedral anion, carboxylic acid RCOOH will be formed by eliminating OR' through the broken of ester bond, meanwhile alcohol R'OH can also be obtained from the combination of OR' with $H^+$. However, normally the tetrahedral intermediate has a cramped structure with high steric hindrance, which is detrimental to the nucleophilic addition reaction, hence the ester hydrolysis usually carries on with a rather slow rate. In the present invention, the polyester hydrolysis is significantly accelerated by importing special structural fluorinated dicarboxylic acid, concretely, dicarboxylic acid containing a α-C bonded with fluorine atoms. During the hydrolysis process of polyester, the electron cloud density in the C—O bond is reduced by the electron-withdrawing effect of fluorine atom boned to the α-C hence the stability of the tetrahedral anion intermediate will decrease, which is conducive to the nucleophilic addition reaction. Moreover, the steric hindrance of fluorinated dicarboxylic acid is less than that of terephthalic acid, which further promotes the nucleophilic addition reaction, thus significantly increasing the degradation rate. However, the degradation rate of polyester will not be improved significantly if the imported diol contains fluorine atom bonded to β-C because the electron-withdrawing effect generated by fluorine atom can only pass to adjacent carbon atom but hardly to C—O bond in ester group, hence the attacking of OH— upon carbonyl in nucleophilic addition reaction will not be affected so much.

Moreover, normally the polyester fiber in service will be exposed to the air for a long time. When the polyester contains a certain amount of oxygen reduction catalyst, the oxygen in air can penetration into the polyester through the free volume and will be absorbed and enriched in the surface of oxygen reduction catalyst, then the absorbed oxygen could be partially reduced to peroxide which can combine with ester groups to form RCOOOR'. When the latter further combines with a proton and the O—O bond breaks off, one RCOOH will form through this broken of ester bond, at the same time, OR' can connect with $H^+$ to produce alcohol HOR'. Through the mechanism mentioned above, the degradation of polyester can be accelerated.

The doping of bismuth oxide together with calcium oxide is realized in this invention via a technological process of solution blending, precipitation and calcining, so as to change the bismuth oxide catalyzed oxygen reduction behavior, through which the degradation rate of polyester is improved. To a certain extent, the closer the dopant ion radius is to the doped ion radius, the easier the formation of oxygen vacancies could be, which is favorable to the conduction of oxygen ions. In this invention, $Ca^{2+}$, with the same radius to $Bi^{3+}$ (both are 0.103 nm), is selected as the doping ion, which can improve the conduction rate of oxygen ions and the degree of oxygen reduction reaction. The effect of doping modification on bismuth trioxide is clarified as follows.

On one hand, the doping mode herein will destroy the crystal plane structure of $Bi_2O_3$ so as to enlarge its specific surface area, hence the oxygen adsorption capacity per unit mass of $Bi_2O_3$ is increased. On the other hand, the doping mode herein will change the adsorption mode and oxygen reduction mechanism of $Bi_2O_3$. Concretely, $O_2$ molecules tend to be adsorbed in the end type through a physical adsorption of low strength or a weak chemical adsorption into the surface of original monoclinic $Bi_2O_3$ and to be reduced to peroxides, in addition, the adsorption will also be affected by the steric hindrance of Bi atom in the surface. Whereas in the doped $Bi_2O_3$, the adsorption changes to the side type which will not be affect by the steric hindrance, and the proportion of chemical adsorption is improved, moreover, the breaking off of O—O bond is also promoted, i.e., the oxygen reduction efficiency is increased. Therefore, the degradation of polyester rate will be accelerated by importing doped $Bi_2O_3$. Nevertheless, combining bismuth oxide with calcium oxide just by physical blending cannot lead to the effects mentioned above, because the crystal plane structure, the adsorption mode and the oxygen reduction mechanism of $Bi_2O_3$ will not change in that way.

The degradation will start in the surface of fiber made of common polyester, whereas in this invention, a comprehensive degradation with high efficiency could be realized owing to the polyester dispersed with oxygen reduction agent which can maintain oxygen internally for a long time.

Moreover, the main-chain silicated diol, which can enlarge the free volume of polyester so as to promote the penetration of water or air, will promise a synergistic effect to improve the natural degradation performance of semi-dull polyester drawn yarns together with the doped $Bi_2O_3$.

In conclusion, the present invention provides (1) a type of semi-dull polyester drawn yarns with good dyeing performance, enough mechanical strength, easy recovery and appreciable application value;

(2) a method for preparing the semi-dull polyester drawn yarns in which the dyeing and natural degradation properties is improved by utilizing the main-chain silicated diol that can enlarge the free volume of polyester so as to promote the penetration of dye, air or water into the fiber, in addition the natural degradation is further accelerated by importing fluorinated dicarboxylic acid and doped $Bi_2O_3$.

DETAILED DESCRIPTION OF THE EMBODIMENTS

Based on above mentioned method, the following embodiments are carried out for further demonstration in the present invention. It is to be understood that these embodiments are only intended to illustrate the invention and are not intended to limit the scope of the invention. In addition, it should be understood that after reading the contents described in the present invention, those technical personnel in this field can make various changes or modifications to the invention, and these equivalent forms also fall within the scope of the claims attached to the application.

Example 1

A method for preparing the semi-dull polyester drawn yarns, comprising the steps:

(1) Preparation of Modified Polyester (1.1) Doping Modification of $Bi_2O_3$ (a) evenly mixing a 2.5 wt % of $Ca(NO_3)_2$ aqueous solution and a 22 wt % of $Bi_2O_3$ nitric acid solution, maintaining a 7:100 of molar ratio of $Ca^{2+}$ and $Bi^{3+}$;

(b) depositing the mixed solution by adding 2 mol/L of ammonia water until pH value reaches 10, then washing and drying (105° C., 2.5 hr) the precipitate;

(c) after the treatment composed of a heating at 400° C. for 2.5 hr, a heating at 700° C. for 1.5 hr and a cooling in air, crushing the precipitate to doped $Bi_2O_3$ powder with an average size of 0.45 μm;

(1.2) Esterification concocting terephthalic acid, ethylene glycol, dimethylsiloxane diol and 2,2-difluoro-1,3-malonic acid into a slurry (in which the molar ration of terephthalic acid and ethylene glycol is 1:1.2, the total addition of dimethylsiloxane diol and 2,2-difluoro-1,3-malonic acid with a molar ratio of 2:3 is 3 mol % relative to the amount of terephthalic acid), and adding in 0.05 wt % of the doped $Bi_2O_3$, 0.03 wt % of antimony trioxide, 0.22 wt % of titanium dioxide and 0.02 wt % of triphenyl phosphate (all are relative to the amount of terephthalic acid), then carrying out the esterification under a 0.3 MPa of nitrogen pressure at 250° C., finally ending the reaction when the water distillation rate reaches 90% of the theoretical value;

(1.3) Polycondensation after smoothly reducing the pressure from normal value to 490 Pa within 30 min, conducting the low vacuum polycondensation for the esterification products at 272° C. for 35 min, then further reducing the pressure to 100 Pa and continuing the high vacuum polycondensation at 270° C. for 50 min, finally obtaining the modified polyester with a molecular weight of 30000 Da and a molecular weight distribution index of 2.0;

(2) Spinning of Semi-Dull Polyester Drawn Yarn through a FDY technological way including stages of metering, spinneret extruding (at 290° C.), cooling (at 22° C.), oiling, stretching as well as heat setting (carried on with the parameters of interlacing pressure 0.26 MPa, godet roller 1 speed 2300 m/min, godet roller 1 temperature 85° C., godet roller 2 speed 4500 m/min, godet roller 2 temperature 140° C.), and winding (4420 m/min), converting the modified polyester into semi-dull polyester drawn yarns with the mechanical performance indices of monofilament fineness 0.7 dtex, breaking strength 3.6 cN/dtex, elongation at break 32.0%, interlacing degree 13/m, linear density deviation rate 0.95%, breaking strength CV value 4.4%, breaking elongation CV value 8.8%, and boiling water shrinkage rate 6.0%;

with the dyeing performance indices of dye uptake 87.5% (at 120° C.), K/S value 24.22, color fastness to soaping level 5, color fastness to dry crocking level 5, and color fastness to wet crocking level 5;

and with an intrinsic viscosity drop by 26% when stored at 25° C. and R.H. 65% for 60 months.

Comparison 1

A method for preparing the semi-dull polyester drawn yarns involved steps basically the same as those in Example 1, except for no modification for polyester, from which the finally obtained semi-dull polyester drawn yarns possess the mechanical performance indices of monofilament fineness 0.7 dtex, breaking strength 3.5 cN/dtex, elongation at break 33.0%, interlacing degree 13/m, linear density deviation rate 0.95%, breaking strength CV value 4.50%, breaking elongation CV value 8.8%, and boiling water shrinkage rate 6.2%;

the dyeing performance indices of dye uptake 85.6% (at 130° C.), K/S value 21.28, color fastness to soaping level 4, color fastness to dry crocking level 4-5, and color fastness to wet crocking level 3-4;

and an intrinsic viscosity drop by 4.2% when stored at 25° C. and R.H. 65% for 60 months.

The comparison shows that the modification herein will significantly improve the dyeing and natural degradation performance of polyester fiber without loss of mechanical properties.

Comparison 2

A method for preparing the semi-dull polyester drawn yarns involved steps basically the same as those in Example 1, except for using 1,6-hexanediol instead of dimethylsiloxane glycol in step (1), from which the finally obtained semi-dull polyester drawn yarns possess the mechanical performance indices of monofilament fineness 0.7 dtex, breaking strength 3.4 cN/dtex, elongation at break 35.0%, interlacing degree 13/m, linear density deviation rate 0.95%, breaking strength CV value 4.30%, breaking elongation CV value 8.8%, and boiling water shrinkage rate 6.5%;

the dyeing performance indices of dye uptake 84.8% (at 130° C.), K/S value 20.56, color fastness to soaping level 4-5, and color fastness to wet crocking level 4, which are all lower than those in Example 1;

and an intrinsic viscosity drop by 16.7% when stored at 25° C. and R.H. 65% for 60 months.

The comparison shows that the introducing of main-chain silicated diol will import —Si—O—Si— bonds into polyester molecular chains so as to reduce the activation energy for internal rotation and to enlarge the free volume of polyester molecules, leading to a more efficient improvement on the dyeing and natural degradation performance than the alkylene substituent.

Comparison 3

A method for preparing the semi-dull polyester drawn yarns involved steps basically the same as those in Example 1, except for no addition of doped $Bi_2O_3$ in step (2), from which the finally obtained semi-dull polyester drawn yarns possess the mechanical performance indices of monofilament fineness 0.7 dtex, breaking strength 3.5 cN/dtex, elongation at break 34.0%, interlacing degree 13/m, linear density deviation rate 0.95%, breaking strength CV value 4.20%, breaking elongation CV value 8.8%, and boiling water shrinkage rate 6.4%;

the dyeing performance indices of dye uptake 87.2% (at 130° C.), K/S value 23.98, color fastness to soaping level 4-5, color fastness to dry crocking level 4, and color fastness to wet crocking level 4, which are all lower than those in Example 1;

and an intrinsic viscosity drop by 13.7% when stored at 25° C. and R.H. 65% for 60 months.

The comparison shows that the importing of doped $Bi_2O_3$ will bring considerable acceleration to the natural degradation of polyester fiber without loss of processiblity and mechanical properties.

Comparison 4

A method for preparing the semi-dull polyester drawn yarns involved steps basically the same as those in Example 1, except for using 3,3-difluoroglutaric acid instead of 2,2-difluoro-1,3-malonic acid in step (1), from which the finally obtained semi-dull polyester drawn yarns possess the mechanical performance indices of monofilament fineness 0.7 dtex, breaking strength 3.3 cN/dtex, elongation at break 35.0%, interlacing degree 13/m, linear density deviation rate 0.95%, breaking strength CV value 4.00%, breaking elongation CV value 8.8%, and boiling water shrinkage rate 6.5%;

the dyeing performance indices of dye uptake 86.97% (at 130° C.), K/S value 24.05, color fastness to soaping level 4-5, color fastness to dry crocking level 4, and color fastness to wet crocking level 4, which are all lower than those in Example 1;

and an intrinsic viscosity drop by 12.8% when stored at 25° C. and R.H. 65% for 60 months.

The comparison shows that compared with α-C bonded fluorine atom, β-C bonded fluorine atom in the modified polyester can only make rather weak effect upon the natural degradation of the obtained polyester fiber, because its electron-withdrawing effect just pass to the neighbor atoms of β-C so as to give little influence on the nucleophilic addition reaction of ester carbonyl when attacked by $OH^-$.

Example 2

A method for preparing the semi-dull polyester drawn yarns, comprising the steps:

(1) Preparation of Modified Polyester (1.1) Doping Modification of $Bi_2O_3$ (a) evenly mixing a 2 wt % of $Ca(NO_3)_2$ aqueous solution and a 20 wt % of $Bi_2O_3$ nitric acid solution, maintaining a 5:100 of molar ratio of $Ca^{2+}$ and $Bi^{3+}$;

(b) depositing the mixed solution by adding 2 mol/L of ammonia water until pH value reaches 9, then washing and drying (105° C., 2.5 hr) the precipitate;

(c) after the treatment composed of a heating at 400° C. for 2 hr, a heating at 700° C. for 1 hr and a cooling in air, crushing the precipitate to doped $Bi_2O_3$ powder with an average size of 0.4 μm;

(1.2) Esterification concocting terephthalic acid, ethylene glycol, dimethyldiphenyldisiloxane glycol and 2,2-difluoro-1,4-succinic acid into a slurry (in which the molar ration of terephthalic acid and ethylene glycol is 1:1.5, the total addition of dimethyldiphenyldisiloxane glycol and 2,2-difluoro-1,4-succinic acid with a molar ratio of 2:5 is 3.2 mol % relative to the amount of terephthalic acid), and adding in 0.04 wt % of the doped $Bi_2O_3$, 0.04 wt % of antimony trioxide, 0.20 wt % of titanium dioxide and 0.04 wt % of trimethyl phosphate (all are relative to the amount of terephthalic acid), then carrying out the esterification under a 0.2 MPa of nitrogen pressure at 252° C., finally ending the reaction when the water distillation rate reaches 90% of the theoretical value;

(1.3) Polycondensation after smoothly reducing the pressure from normal value to 420 Pa within 35 min, conducting the low vacuum polycondensation for the esterification products at 270° C. for 40 min, then further reducing the pressure to 95 Pa and continuing the high vacuum polycondensation at 271° C. for 55 min, finally obtaining the modified polyester with a molecular weight of 28000 Da and a molecular weight distribution index of 2.0;

(2) Spinning of Semi-Dull Polyester Drawn Yarn through a FDY technological way including stages of metering, spinneret extruding (at 285° C.), cooling (at 20° C.), oiling, stretching as well as heat setting (carried on with the parameters of interlacing pressure 0.24 MPa, godet roller 1 speed 2700 m/min, godet roller 1 temperature 90° C., godet roller 2 speed 4300 m/min, godet roller 2 temperature 125° C.), and winding (4130 m/min), converting the modified polyester into semi-dull polyester drawn yarns with the mechanical performance indices of monofilament fineness 1.5 dtex, breaking strength 3.5 cN/dtex, elongation at break 28.0%, interlacing degree 11/m, linear density deviation rate 0.9%, breaking strength CV value 4.9%, breaking elongation CV value 8.8%, and boiling water shrinkage rate 7.0%;

with the dyeing performance indices of dye uptake 91.8% (at 120° C.), K/S value 22.17, color fastness to soaping level 5, color fastness to dry crocking level 5, and color fastness to wet crocking level 6;

and with an intrinsic viscosity drop by 20% when stored at 25° C. and R.H. 65% for 60 months.

Example 3

A method for preparing the semi-dull polyester drawn yarns, comprising the steps:

(1) Preparation of Modified Polyester (1.1) Doping Modification of $Bi_2O_3$ (a) evenly mixing a 3 wt % of $Ca(NO_3)_2$ aqueous solution and a 25 wt % of $Bi_2O_3$ nitric acid solution, maintaining a 8:100 of molar ratio of $Ca^{2+}$ and $Bi^{3+}$;

(b) depositing the mixed solution by adding 2 mol/L of ammonia water until pH value reaches 9, then washing and drying (110° C., 3 hr) the precipitate;

(c) after the treatment composed of a heating at 400° C. for 3 hr, a heating at 700° C. for 2 hr and a cooling in air, crushing the precipitate to doped $Bi_2O_3$ powder with an average size of 0.4 μm;

(1.2) Esterification concocting terephthalic acid, ethylene glycol, tetramethyldisiloxane diol and 2,2-difluoro-1,5-glutaric acid into a slurry (in which the molar ration of terephthalic acid and ethylene glycol is 1:1.3, the total addition of tetramethyldisiloxane diol and 2,2-difluoro-1,5-glutaric acid with a molar ratio of 2.5:3 is 3.5 mol % relative to the amount of terephthalic acid), and adding in 0.04 wt % of the doped $Bi_2O_3$, 0.05 wt % of antimony trioxide, 0.24 wt % of titanium dioxide and 0.01 wt % of trimethyl phosphite (all are relative to the amount of terephthalic acid), then carrying out the esterification under a 0.1 MPa of nitrogen pressure at 255° C., finally ending the reaction when the water distillation rate reaches 92% of the theoretical value;

(1.3) Polycondensation after smoothly reducing the pressure from normal value to 500 Pa within 45 min, conducting the low vacuum polycondensation for the esterification products at 280° C. for 30 min, then further reducing the pressure to 96 Pa and continuing the high vacuum polycondensation at 273° C. for 60 min, finally obtaining the modified polyester with a molecular weight of 25000 Da and a molecular weight distribution index of 2.2;

(2) Spinning of Semi-Dull Polyester Drawn Yarn through a FDY technological way including stages of metering, spinneret extruding (at 285° C.), cooling (at 17° C.), oiling, stretching as well as heat setting (carried on with the parameters of interlacing pressure 0.30 MPa, godet roller 1 speed 2400 m/min, godet roller 1 temperature 83° C., godet roller 2 speed 4500 m/min, godet roller 2 temperature 125° C.), and winding (4130 m/min), converting the modified polyester into semi-dull polyester drawn yarns with the mechanical performance indices of monofilament fineness 2.0 dtex, breaking strength 3.6 cN/dtex, elongation at break 36.0%, interlacing degree 15/m, linear density deviation rate 0.95%, breaking strength CV value 4.4%, breaking elongation CV value 8.6%, and boiling water shrinkage rate 6.5%;

with the dyeing performance indices of dye uptake 87.5% (at 120° C.), K/S value 22.17, color fastness to soaping level 5, color fastness to dry crocking level 5, and color fastness to wet crocking level 5;

and with an intrinsic viscosity drop by 18% when stored at 25° C. and R.H. 65% for 60 months.

Example 4

A method for preparing the semi-dull polyester drawn yarns, comprising the steps:

(1) Preparation of Modified Polyester (1.1) Doping Modification of $Bi_2O_3$ (a) evenly mixing a 2.5 wt % of $Ca(NO_3)_2$ aqueous solution and a 25 wt % of $Bi_2O_3$ nitric acid solution, maintaining a 8:100 of molar ratio of $Ca^{2+}$ and $Bi^{3+}$;

(b) depositing the mixed solution by adding 2 mol/L of ammonia water until pH value reaches 10, then washing and drying (110° C., 3 hr) the precipitate;

(c) after the treatment composed of a heating at 400° C. for 2.5 hr, a heating at 700° C. for 2 hr and a cooling in air, crushing the precipitate to doped $Bi_2O_3$ powder with an average size of 0.4 μm;

(1.2) Esterification concocting terephthalic acid, ethylene glycol, dimethylsiloxane diol and 2,2,3,3-tetrafluoro-1,4-succinic acid into a slurry (in which the molar ration of terephthalic acid and ethylene glycol is 1:1.6, the total addition of dimethylsiloxane diol and 2,2,3,3-tetrafluoro-1,4-succinic acid with a molar ratio of 2.2:4 is 4 mol % relative to the amount of terephthalic acid), and adding in 0.07 wt % of the doped $Bi_2O_3$, 0.04 wt % of antimony trioxide, 0.25 wt % of titanium dioxide and 0.03 wt % of triphenyl phosphate (all are relative to the amount of terephthalic acid), then carrying out the esterification under a 0.1 MPa of nitrogen pressure at 250° C., finally ending the reaction when the water distillation rate reaches 95% of the theoretical value;

(1.3) Polycondensation after smoothly reducing the pressure from normal value to 440 Pa within 40 min, conducting the low vacuum polycondensation for the esterification products at 278° C. for 40 min, then further reducing the pressure to 99 Pa and continuing the high vacuum polycondensation at 273° C. for 75 min, finally obtaining the modified polyester with a molecular weight of 25000 Da and a molecular weight distribution index of 1.8;

(2) Spinning of Semi-Dull Polyester Drawn Yarn through a FDY technological way including stages of metering, spinneret extruding (at 295° C.), cooling (at 17° C.), oiling, stretching as well as heat setting (carried on with the parameters of interlacing pressure 0.20 MPa, godet roller 1 speed 2600 m/min, godet roller 1 temperature 90° C., godet roller 2 speed 4200 m/min, godet roller 2 temperature 125° C.), and winding (4360 m/min), converting the modified polyester into semi-dull polyester drawn yarns with the mechanical performance indices of monofilament fineness 3.0 dtex, breaking strength 3.5 cN/dtex, elongation at break 32.0%, interlacing degree 12/m, linear density deviation rate 1.0%, breaking strength CV value 4.9%, breaking elongation CV value 9.0%, and boiling water shrinkage rate 6.8%;

with the dyeing performance indices of dye uptake 89.63% (at 120° C.), K/S value 25.56, color fastness to soaping level 5, color fastness to dry crocking level 5, and color fastness to wet crocking level 5;

and with an intrinsic viscosity drop by 18% when stored at 25° C. and R.H. 65% for 60 months.

Example 5

A method for preparing the semi-dull polyester drawn yarns, comprising the steps:

(1) Preparation of Modified Polyester (1.1) Doping Modification of $Bi_2O_3$ (a) evenly mixing a 2.5 wt % of $Ca(NO_3)_2$ aqueous solution and a 24 wt % of $Bi_2O_3$ nitric acid solution, maintaining a 6:100 of molar ratio of $Ca^{2+}$ and $Bi^{3+}$;

(b) depositing the mixed solution by adding 2 mol/L of ammonia water until pH value reaches 10, then washing and drying (107° C., 2.5 hr) the precipitate;

(c) after the treatment composed of a heating at 400° C. for 2.5 hr, a heating at 700° C. for 2 hr and a cooling in air, crushing the precipitate to doped $Bi_2O_3$ powder with an average size of 0.45 μm;

(1.2) Esterification concocting terephthalic acid, ethylene glycol, dimethyldiphenyldisiloxane glycol and 2,2-difluoro-1,3-malonic acid into a slurry (in which the molar ration of terephthalic acid and ethylene glycol is 1:1.8, the total addition of dimethyldiphenyldisiloxane glycol and 2,2-difluoro-1,3-malonic acid with a molar ratio of 3:4 is 4 mol % relative to the amount of terephthalic acid), and adding in 0.05 wt % of the doped $Bi_2O_3$, 0.03 wt % of antimony trioxide, 0.25 wt % of titanium dioxide and 0.01 wt % of trimethyl phosphate (all are relative to the amount of terephthalic acid), then carrying out the esterification in nitrogen under a normal pressure at 260° C., finally ending the reaction when the water distillation rate reaches 91% of the theoretical value;

(1.3) Polycondensation after smoothly reducing the pressure from normal value to 490 Pa within 50 min, conducting the low vacuum polycondensation for the esterification products at 282° C. for 35 min, then further reducing the pressure to 100 Pa and continuing the high vacuum polycondensation at 274° C. for 80 min, finally obtaining the modified polyester with a molecular weight of 30000 Da and a molecular weight distribution index of 1.8;

(2) Spinning of Semi-Dull Polyester Drawn Yarn through a FDY technological way including stages of metering, spinneret extruding (at 292° C.), cooling (at 22° C.), oiling, stretching as well as heat setting (carried on with the parameters of interlacing pressure 0.20 MPa, godet roller 1 speed 2300 m/min, godet roller 1 temperature 80° C., godet roller 2 speed 4200 m/min, godet roller 2 temperature 125° C.), and winding (4420 m/min), converting the modified polyester into semi-dull polyester drawn yarns with the mechanical performance indices of monofilament fineness 1.6 dtex, breaking strength 3.7 cN/dtex, elongation at break 31.0%, interlacing degree 15/m, linear density deviation rate 0.92%, breaking strength CV value 5.0%, breaking elongation CV value 8.4%, and boiling water shrinkage rate 7.0%;

with the dyeing performance indices of dye uptake 89.20% (at 120° C.), K/S value 23.44, color fastness to soaping level 5, color fastness to dry crocking level 5, and color fastness to wet crocking level 6;

and with an intrinsic viscosity drop by 21% when stored at 25° C. and R.H. 65% for 60 months.

Example 6

A method for preparing the semi-dull polyester drawn yarns, comprising the steps:

(1) Preparation of Modified Polyester (1.1) Doping Modification of $Bi_2O_3$ (a) evenly mixing a 3 wt % of $Ca(NO_3)_2$ aqueous solution and a 24 wt % of $Bi_2O_3$ nitric acid solution, maintaining a 7:100 of molar ratio of $Ca^{2+}$ and $Bi^{3+}$;

(b) depositing the mixed solution by adding 2 mol/L of ammonia water until pH value reaches 10, then washing and drying (110° C., 2.5 hr) the precipitate;

(c) after the treatment composed of a heating at 400° C. for 3 hr, a heating at 700° C. for 1.5 hr and a cooling in air, crushing the precipitate to doped $Bi_2O_3$ powder with an average size of 0.45 μm;

(1.2) Esterification concocting terephthalic acid, ethylene glycol, tetramethyldisiloxane diol and 2,2-difluoro-1,4-succinic acid into a slurry (in which the molar ration of terephthalic acid and ethylene glycol is 1:2.0, the total addition of tetramethyldisiloxane diol and 2,2-difluoro-1,4-succinic acid with a molar ratio of 3:5 is 4.5 mol % relative to the amount of terephthalic acid), and adding in 0.07 wt % of the doped $Bi_2O_3$, 0.04 wt % of antimony trioxide, 0.20 wt % of titanium dioxide and 0.05 wt % of trimethyl phosphite (all are relative to the amount of terephthalic acid), then carrying out the esterification in nitrogen under a normal pressure at 260° C., finally ending the reaction when the water distillation rate reaches 91% of the theoretical value;

(1.3) Polycondensation after smoothly reducing the pressure from normal value to 450 Pa within 35 min, conducting the low vacuum polycondensation for the esterification products at 270° C. for 50 min, then further reducing the pressure to 100 Pa and continuing the high vacuum polycondensation at 275° C. for 85 min, finally obtaining the modified polyester with a molecular weight of 27800 and a molecular weight distribution index of 1.8;

(2) Spinning of Semi-Dull Polyester Drawn Yarn through a FDY technological way including stages of metering, spinneret extruding (at 295° C.), cooling (at 18° C.), oiling, stretching as well as heat setting (carried on with the parameters of interlacing pressure 0.20 MPa, godet roller 1 speed 2300 m/min, godet roller 1 temperature 80° C., godet roller 2 speed 4400 m/min, godet roller 2 temperature 130° C.), and winding (4420 m/min), converting the modified polyester into semi-dull polyester drawn yarns with the mechanical performance indices of monofilament fineness 2.5 dtex, breaking strength 3.5 cN/dtex, elongation at break 33.0%, interlacing degree 11/m, linear density deviation rate 1.0%, breaking strength CV value 5.0%, breaking elongation CV value 8.2%, and boiling water shrinkage rate 6.5%;

with the dyeing performance indices of dye uptake 91.8% (at 120° C.), K/S value 25.56, color fastness to soaping level 5, color fastness to dry crocking level 5, and color fastness to wet crocking level 6;

and with an intrinsic viscosity drop by 22% when stored at 25° C. and R.H. 65% for 60 months.

Example 7

A method for preparing the semi-dull polyester drawn yarns, comprising the steps:

(1) Preparation of Modified Polyester (1.1) Doping Modification of $Bi_2O_3$ (a) evenly mixing a 2.5 wt % of $Ca(NO_3)_2$ aqueous solution and a 25 wt % of $Bi_2O_3$ nitric acid solution, maintaining a 8:100 of molar ratio of $Ca^{2+}$ and $Bi^{3+}$;

(b) depositing the mixed solution by adding 2 mol/L of ammonia water until pH value reaches 10, then washing and drying (110° C., 3 hr) the precipitate;

(c) after the treatment composed of a heating at 400° C. for 3 hr, a heating at 700° C. for 2 hr and a cooling in air, crushing the precipitate to doped $Bi_2O_3$ powder with an average size of 0.45 μm;

(1.2) Esterification concocting terephthalic acid, ethylene glycol, tetramethyldisiloxane diol and 2,2-difluoro-1,5-glutaric acid into a slurry (in which the molar ration of terephthalic acid and ethylene glycol is 1:1.3, the total addition of tetramethyldisiloxane diol and 2,2-difluoro-1,5-glutaric acid with a molar ratio of 2.5:3 is 5 mol % relative to the amount of terephthalic acid), and adding in 0.06 wt % of the doped $Bi_2O_3$, 0.04 wt % of antimony trioxide, 0.21 wt % of titanium dioxide and 0.01 wt % of trimethyl phosphate (all are relative to the amount of terephthalic acid), then carrying out the esterification under a 0.3 MPa of nitrogen pressure at 260° C., finally ending the reaction when the water distillation rate reaches 99% of the theoretical value;

(1.3) Polycondensation after smoothly reducing the pressure from normal value to 500 Pa within 45 min, conducting the low vacuum polycondensation for the esterification products at 280° C. for 50 min, then further reducing the pressure to 90 Pa and continuing the high vacuum polycondensation at 277° C. for 90 min, finally obtaining the modified polyester with a molecular weight of 30000 Da and a molecular weight distribution index of 2.2;

(2) Spinning of Semi-Dull Polyester Drawn Yarn through a FDY technological way including stages of metering, spinneret extruding (at 295° C.), cooling (at 22° C.), oiling, stretching as well as heat setting (carried on with the parameters of interlacing pressure 0.30 MPa, godet roller 1 speed 2700 m/min, godet roller 1 temperature 86° C., godet roller 2 speed 4500 m/min, godet roller 2 temperature 135° C.), and winding (4130 m/min), converting the modified polyester into semi-dull polyester drawn yarns with the mechanical performance indices of monofilament fineness 1.2 dtex, breaking strength 3.5 cN/dtex, elongation at break 32.0%, interlacing degree 13/m, linear density deviation rate 0.88%, breaking strength CV value 4.5%, breaking elongation CV value 9.0%, and boiling water shrinkage rate 7.0%;

with the dyeing performance indices of dye uptake 87.5% (at 120° C.), K/S value 23.55, color fastness to soaping level 5, color fastness to dry crocking level 5, and color fastness to wet crocking level 6;

and with an intrinsic viscosity drop by 26% when stored at 25° C. and R.H. 65% for 60 months.

What is claimed is:

1. A preparing method for a semi-dull polyester drawn yarn, which is characterized by manufacturing a fully drawn yarn (FDY) with a modified polyester;

wherein the modified polyester is a product of an esterification and successive polycondensation reactions of evenly mixed terephthalic acid, ethylene glycol, a main chain silicated diol, a fluorinated dicarboxylic acid, a matting agent and a doped $Bi_2O_3$;

wherein the main chain silicated diol is selected from the group consisting of dimethylsiloxane diol, dimethyldiphenyldisiloxane glycol and tetramethyldisiloxane diol, and the fluorinated dicarboxylic acid is selected from the group consisting of 2,2-difluoro-1,3-malonic acid, 2,2-difluoro-1,4-succinic acid, 2,2-difluoro-1,5-glutaric acid and 2,2,3,3-tetrafluoro-1,4-succinic acid;

wherein the modified polyester has a content of the matting agent of 0.20-0.25 wt %, wherein the doped $Bi_2O_3$ is obtained through a process of evenly mixing $Ca^{2+}$ solution and $Bi^{3+}$ solution, then adding in a precipitant until a pH value of the mixed solution becomes 9-10, and finally calcining a precipitate product.

2. The preparing method of claim 1, wherein the $Ca^{2+}$ solution is an aqueous one with a concentration of 2-3%, wherein an anion of the $Ca^{2+}$ solution is $NO_3^-$; the $Bi^{3+}$ solution is a product of dissolving 20-25 wt % of $Bi_2O_3$ in nitric acid; the precipitant is ammonia water with a concentration of 2 mol/L;

wherein the evenly mixed solution has a (5-8):100 molar ratio of $Ca^{2+}$ and $Bi^{3+}$ before precipitation;

wherein the calcining is preceded by a washing process and a drying process, and the drying process is carried out under a temperature of 105-110° C. for 2-3 hrs;

wherein the calcining comprises steps of heating at 400° C. for 2-3 hrs, heating at 700° C. for 1-2 hrs and cooling in air to obtain the doped $Bi_2O_3$; then crushing the doped $Bi_2O_3$ into powder with an average size of less than 0.5 μm.

3. The preparing method of claim 2, wherein the modified polyester is manufactured through the following steps:

(1) Esterification concocting the terephthalic acid, the ethylene glycol, the main chain silicated diol and the fluorinated dicarboxylic acid into a slurry, and adding in the doped $Bi_2O_3$, a catalyst, the matting agent and a stabilizer, then carrying out the esterification under a nitrogen pressure ranged from atmospheric pressure to 0.3 MPa, finally ending the esterification when a water distillation rate reaches 90% of a theoretical value;

(1.3) Polycondensation after smoothly reducing the nitrogen pressure to less than 500 Pa within 30-50 min, conducting a low vacuum polycondensation for products of the esterification at 250-260° C. for 30-50 min, then further reducing the nitrogen pressure to 100 Pa and continuing with a high vacuum polycondensation at 270-282° C. for 50-90 min.

4. The preparing method of claim 3, wherein a molar ratio of the terephthalic acid and the ethylene glycol is 1:(1.2-2.0), and a total addition of the main chain silicated diol and the fluorinated dicarboxylic acid is 3-5 mol % of an amount of the terephthalic acid, and a molar ratio of the main chain silicated diol and the fluorinated dicarboxylic acid is (2-3):(3-5); and an amount of the doped $Bi_2O_3$, the catalyst, the matting agent and the stabilizer is 0.04-0.07 wt %, 0.03-0.05 wt %, 0.20-0.25 wt % and 0.01-0.05 wt % of the amount of the terephthalic acid, respectively.

5. The preparing method of claim 4, wherein the catalyst is antimony trioxide, ethylene glycol antimony or antimony acetate, wherein the matting agent is titanium dioxide, and wherein the stabilizer is triphenyl phosphate, trimethyl phosphate or trimethyl phosphite.

6. The preparing method for semi-dull polyester drawn yarns of claim 5, wherein the modified polyester has a molecular weight of 25000-30000 Da and a molecular weight distribution index of 1.8-2.2.

7. The preparing method of claim 1, wherein the FDY technique comprises the steps of metering, spinneret extruding, cooling, oiling, stretching, heat setting and winding, wherein a spinning temperature is 285-295° C., a cooling temperature is 17-22° C., an interlacing pressure is 0.20-0.30 MPa, a first godet roller speed is 2300-2700 m/min, a first godet roller temperature is 80-90° C., a second godet roller speed is 4200-4500 m/min, a second godet roller temperature is 125-140° C., and a winding speed is 4130-4420 m/min.

8. A semi-dull polyester drawn yarn manufactured by the preparing method of claim 1,
wherein the modified polyester has a molecular chain structure composed of terephthalic acid segments, ethylene glycol segments, main chain silicated diol segments and fluorinated dicarboxylic acid segments;
wherein the modified polyester is dispersed with the matting agent and a doped $Bi_2O_3$ powder, and a content of the matting agent is 0.20-0.25 wt %.

9. The semi-dull polyester drawn yarn of claim 8, wherein the semi-dull polyester drawn yarn is characterized by mechanical performance indices of monofilament fineness 0.7-3.0 dtex, breaking strength ≥3.5 cN/dtex, elongation at break 32.0±4.0%, interlacing degree 13±2/m, linear density deviation rate ≤1.0%, breaking strength CV value ≤5.0%, breaking elongation CV value ≤9.0%, and boiling water shrinkage rate 6.5±0.5%.

10. The semi-dull polyester drawn yarn of claim 8, wherein the semi-dull polyester drawn yarn is characterized by dyeing performance indices of dye uptake 87.5-91.8% at 120° C., K/S value 22.17-25.56, color fastness to soaping level 5, color fastness to dry crocking level 5, and color fastness to wet crocking more than 4;
and by an intrinsic viscosity drop of 18-26% after a storage at 25° C. and R.H. 65% for 60 months.

11. The semi-dull polyester drawn yarn of claim 8,
wherein the $Ca^{2+}$ solution is an aqueous one with a concentration of 2-3%, wherein an anion of the $Ca^{2+}$ solution is $NO_3^-$; the $Bi^{3+}$ solution is a product of dissolving 20-25 wt % of $Bi_2O_3$ in nitric acid; the precipitant is ammonia water with a concentration of 2 mol/L;
wherein the evenly mixed solution has a (5-8):100 molar ratio of $Ca^{2+}$ and $Bi^{3+}$ before precipitation;
wherein the calcining is preceded by a washing process and a drying process, and the drying process is carried out under a temperature of 105-110° C. for 2-3 hrs;
wherein the calcining comprises steps of heating at 400° C. for 2-3 hrs, heating at 700° C. for 1-2 hrs and cooling in air to obtain the doped $Bi_2O_3$; then crushing the doped $Bi_2O_3$ into powder with an average size of less than 0.5 μm.

12. The semi-dull polyester drawn yarn of claim 8, wherein the modified polyester is manufactured through the following steps:
(1) Esterification
concocting the terephthalic acid, the ethylene glycol, the main chain silicated diol and the fluorinated dicarboxylic acid into a slurry, and adding in the doped $Bi_2O_3$, a catalyst, the matting agent and a stabilizer, then carrying out the esterification under a nitrogen pressure ranged from atmospheric pressure to 0.3 MPa, finally ending the esterification when a water distillation rate reaches 90% of a theoretical value;
(1.3) Polycondensation
after smoothly reducing the nitrogen pressure to less than 500 Pa within 30-50 min, conducting a low vacuum polycondensation for products of the esterification at 250-260° C. for 30-50 min, then further reducing the nitrogen pressure to 100 Pa and continuing with a high vacuum polycondensation at 270-282° C. for 50-90 min.

13. The semi-dull polyester drawn yarn of claim 8,
wherein a molar ratio of the terephthalic acid and the ethylene glycol is 1:(1.2-2.0), and a total addition of the main chain silicated diol and the fluorinated dicarboxylic acid is 3-5 mol % of an amount of the terephthalic acid, and a molar ratio of the main chain silicated diol and the fluorinated dicarboxylic acid is (2-3):(3-5); and an amount of the doped $Bi_2O_3$, the catalyst, the matting agent and the stabilizer are 0.04-0.07 wt %, 0.03-0.05 wt %, 0.20-0.25 wt % and 0.01-0.05 wt % of the amount of the terephthalic acid, respectively.

14. The semi-dull polyester drawn yarn of claim 8, wherein the catalyst is antimony trioxide, ethylene glycol antimony or antimony acetate, wherein the matting agent is titanium dioxide, and wherein the stabilizer is triphenyl phosphate, trimethyl phosphate or trimethyl phosphite.

15. The semi-dull polyester drawn yarn of claim 8, wherein the modified polyester has a molecular weight of 25000-30000 Da and a molecular weight distribution index of 1.8-2.2.

16. The semi-dull polyester drawn yarn of claim 8,
wherein the FDY technique comprises the steps of metering, spinneret extruding, cooling, oiling, stretching, heat setting and winding, wherein a spinning temperature is 285-295° C., a cooling temperature is 17-22° C., an interlacing pressure is 0.20-0.30 MPa, a first godet roller speed is 2300-2700 m/min, a first godet roller temperature is 80-90° C., a second godet roller speed is 4200-4500 m/min, a second godet roller temperature is 125-140° C., and a winding speed is 4130-4420 m/min.

* * * * *